United States Patent [19]

Alderman

[11] 4,268,167
[45] May 19, 1981

[54] DISTANCE MEASURING SYSTEM

[76] Inventor: Robert J. Alderman, 812 59th St. N.W., Bradenton, Fla. 33505

[21] Appl. No.: 1,582

[22] Filed: Jan. 8, 1979

[51] Int. Cl.³ .......................... G01C 3/00; G01C 5/00
[52] U.S. Cl. ........................................ 356/1; 343/112 D
[58] Field of Search ..................... 356/1, 4; 343/112 D

[56] References Cited

U.S. PATENT DOCUMENTS

| | | | |
|---|---|---|---|
| 2,830,487 | 4/1958 | Griffith | 356/4 |
| 3,434,785 | 3/1969 | Weber | 356/4 |
| 3,620,626 | 11/1971 | Daly | 356/4 |
| 3,687,556 | 8/1972 | Price | 356/1 |
| 3,714,657 | 1/1973 | Lapeyre | 343/112 D |
| 4,029,415 | 6/1977 | Johnson | 356/1 |

Primary Examiner—Stephen C. Buczinski
Attorney, Agent, or Firm—Jones, Thomas & Askew

[57] ABSTRACT

System for measuring the distance between a central location and any number of remote locations. Two parallel beams of radiation emanate outwardly from the central location, and the beams are rotated at a known angular velocity. The time required for each of the two beams of radiation to sweep past a given point at a remote location is a function of the distance which separates the remote location from the central location, and that time can be determined at the remote location to indicate the separation distance. The beams of radiation may be parallel beams, or alternatively the beams may diverge at a known fixed angle that does not originate at the point of rotation.

8 Claims, 10 Drawing Figures

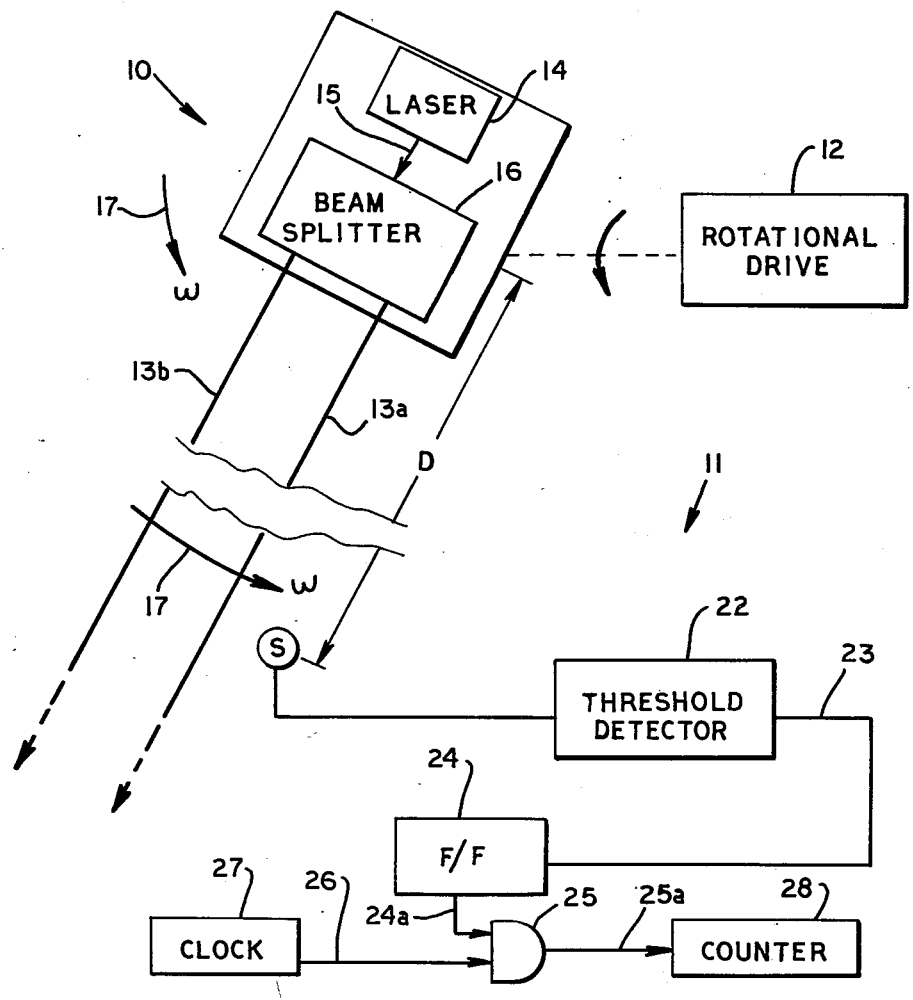
*Fig_1*
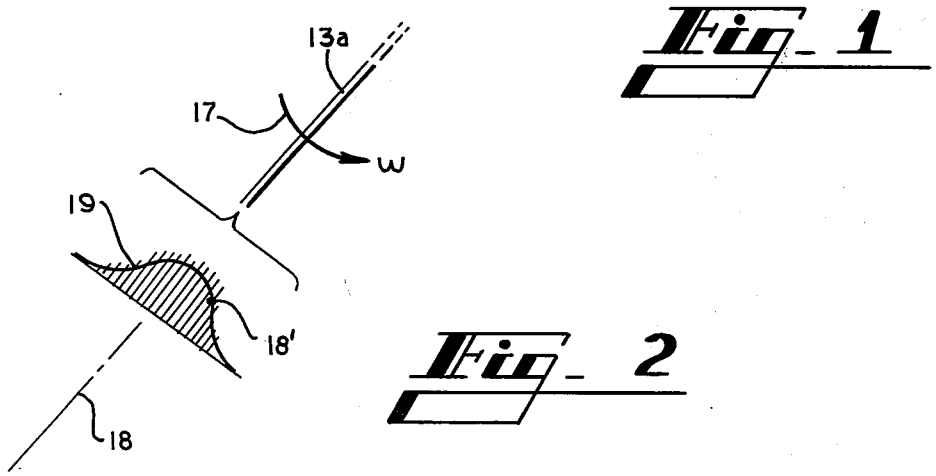
*Fig_2*

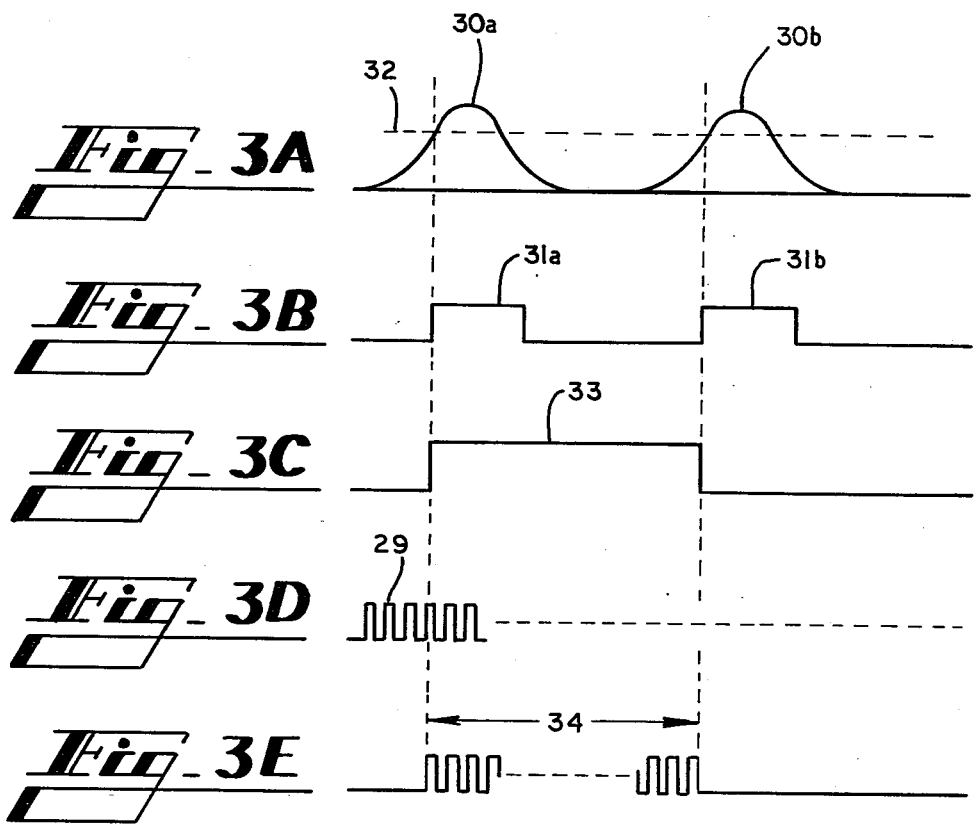
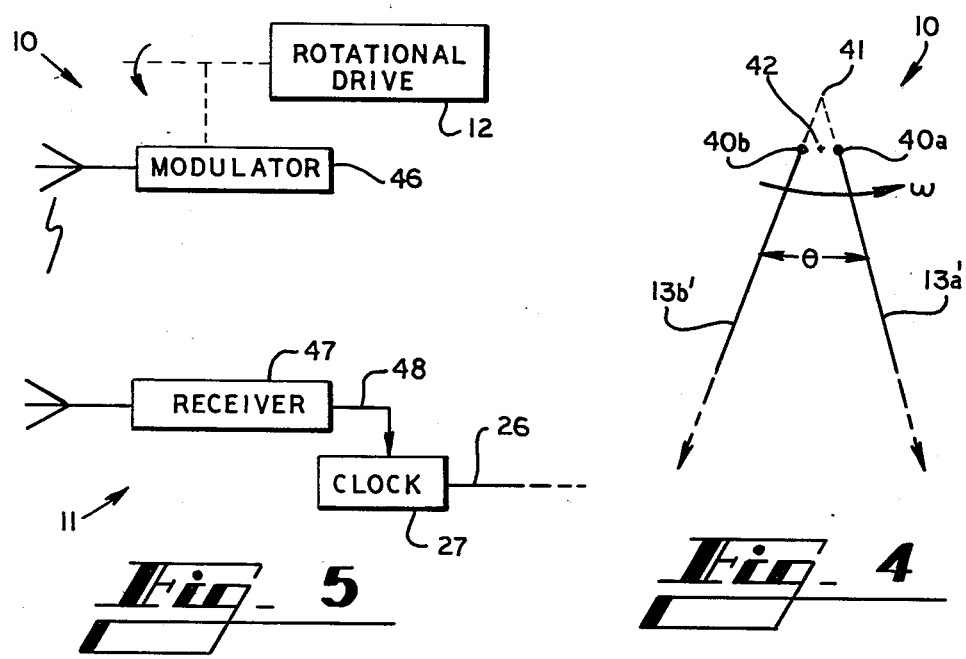

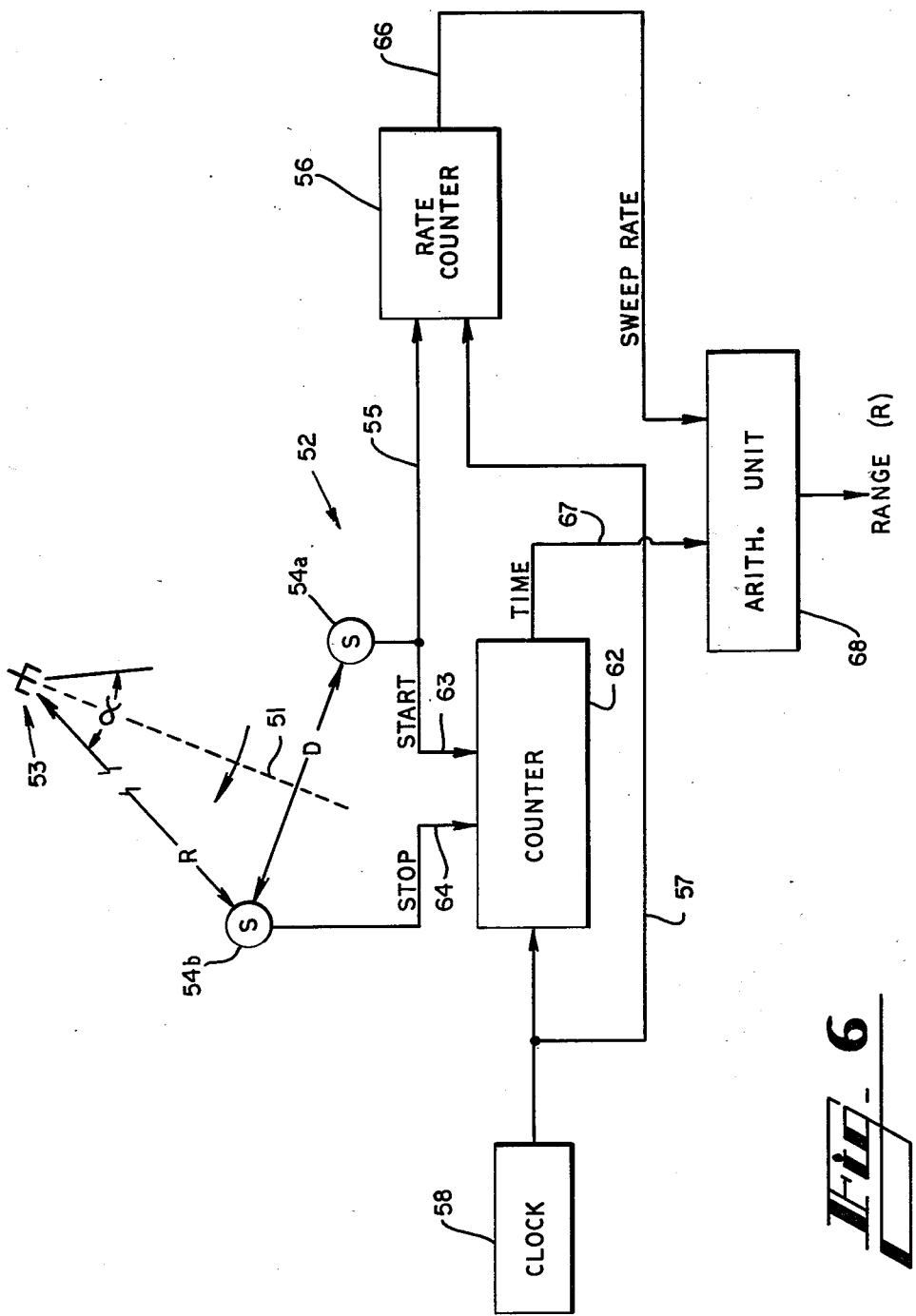
FIG_6

DISTANCE MEASURING SYSTEM

DESCRIPTION

BACKGROUND OF THE INVENTION

This invention relates in general to a system for measuring the distance between two locations, and in particular to a distance measuring system which operates passively at remote locations, that is, without need for a transmitter at any remote location.

The need for apparatus which can effectively measure the distance between two locations without actually bridging the locations with a measuring tape or the like is well-known in many arts. One such application for distance measuring apparatus is in the field of surveying, where distances too lengthy or inaccessible for a measuring tape have traditionally been measured either by triangulation, or by techniques which measure the transit time of radiation from a home location outbound to a remote location (which typically includes a mirror or another reflective device) and return to the home location. Triangulation techniques are typically time-consuming and, depending on the distances involved, may be relatively inaccurate. The more sophisticated surveying measurement techniques involving the measurement of radiation transit time are relatively expensive and sophisticated, particularly in the context of surveying and related field activities, inasmuch as apparatus capable of accurately measuring the transit time of light is usually required.

Another application for distance measuring systems is found in aircraft navigation. While distance-measuring equipment (DME) has been used for some time in aircraft navigation, only those aircraft equipped with a DME transponder may determine their range from a DME base station. That "range", moreover, is determined by the transit time of radio signals between the DME-equipped aircraft and a DME base station, and so the measured range is actually the line-of-sight slant range between the aircraft and the base station, rather than being the ground range which the pilot desires to know. DME transponders are relatively expensive and are actually radio transmitter-receiver combinations, and the number of DME-equipped aircraft which can simultaneously interrogate a particular base station for ranging purposes is limited by technical considerations.

SUMMARY OF THE INVENTION

Stated in general terms, the present invention determines the distance between a reference point and a remote location by determining the time required for one or more beams of radiation, which emanate from the reference point and which rotate about that point at a predetermined angular velocity, to sweep past the remote location. The measured time bears an inverse relation to the radial distance between the reference point and the remote location, and does not depend on the transit time of the radiation or the slant range between the two points.

Stated somewhat more specifically, two beams of radiation may emanate from the reference location, and the beams of radiation may be parallel to each other or may diverge at a known angle from a point that is not on the axis of rotation of the beams. The beams of radiation for the present invention may be beams of laser light that are provided by a laser apparatus and suitable beam-splitting apparatus at the reference location. Apparatus at each remote location includes a suitable detector for the illumination or other radiation, along with apparatus for measuring the elapsed time between detection of the first and second parallel beams by the detector. The receiving apparatus at the remote locations can be equipped to sense a particular threshold amplitude or other characteristic for each detected beam.

In another application of the present invention, the range to the source of a sweeping beam of radiation of undetermined origin can be determined if the sweep of the beam is periodic. The apparent period of the beam is determined by measuring the time between at least two successive sweeps of the beam past a sensor, and the time required for the beam to sweep between two separated sensors is measured. The range between the sensors and the source of radiation can then be determined by straightforward trigonometric relationships.

Accordingly, it is an object of the present invention to provide an improved system for measuring distance.

It is another object of the present invention to provide a distance measuring system in which each remote location is passive.

Yet another object of the present invention is to provide a distance measuring system which is not limited in the number of remote locations which can obtain distance measurements relative to a reference location.

The foregoing and other objects and advantages of the present invention will become more readily apparent from the following description of a disclosed embodiment.

DESCRIPTION OF THE DRAWINGS

FIG. 1 is a schematic diagram and partial plan view of a distance measuring system according to an embodiment of the present invention.

FIG. 2 shows an enlarged fragment of one of the beams of radiation in the disclosed embodiment, along with a graphical illustration of the intensity across the width of the beam.

FIGS. 3(a) through 3(e) show typical waveforms which occur in the operation of the disclosed embodiment.

FIG. 4 is a partial schematic diagram of another embodiment of the present invention.

FIG. 5 is a partial schematic diagram showing a modification for transmitting rotational velocity information from the reference location to the remote location.

FIG. 6 is a schematic diagram and partial plan view of another disclosed embodiment of the present invention, for determining the range to an undetermined source of radiation.

DETAILED DESCRIPTION OF DISCLOSED EMBODIMENTS

The system of the disclosed embodiment depicts a reference location 10 from which the two beams of radiation 13a and 13b are emitted, and a typical remote location 11 at which the beams of radiation are detected and utilized to determine the distance between the reference location and the remote location. Turning first to the reference location 10, it is seen that a pair of parallel radiation beams 13a and 13b are emitted by suitable apparatus at the reference location. The beams 13a and 13b in the disclosed embodiment are beams of optical radiation which may be in the visible spectrum, although it should be understood that other forms of radiation such as invisible optical radiation or radio-frequency (RF) radiation can alternatively be utilized. It is important to the successful practice of the present invention, however, that the beams 13a and 13b be substantially parallel to each other.

The beams of radiation 13a and 13b are provided, in the disclosed embodiment, by a laser 14 which supplies a beam 15 of optical radiation to a beam splitter 16. The beam splitter 16, the construction and operation of which are known to those skilled in the art, is an optical device which splits the single beam of radiation 15 into the pair of parallel beams 13a and 13b. As an alternative to using a single laser and a beam splitter as aforementioned, each of the beams 13a and 13b can be provided by a separate laser. The use of a single laser in combination with a beam splitter is less expensive than two separate lasers, however, and it may prove more difficult to maintain alignment and other optical characteristics of the two beams if separate lasers are employed.

The two beams of radiation 13a and 13b are rotated at a constant angular velocity as indicated by the arrows 17, and this rotation may be provided by mounting the laser 14 and the beam splitter 16 on a turntable or the like which is mechanically driven by the rotational drive 12 to rotate at a constant velocity. Alternatively, the laser can be non-rotatably mounted, with rotation of the beams being provided by a rotating mirror or the like in a manner known to those skilled in the art. The velocity of rotation of the beams 13a and 13b is not considered to be a critical limitation of the present invention, although the velocity should be chosen so as to facilitate timing measurements at the remote locations in view of the expected range of distances to be measured in a particular application, as will become more apparent below.

Turning next to the remote location 11, there is provided a radiation sensor S of a kind which provides a signal in response to detection of each of the beams of radiation 13a and 13b. Where the beams of radiation are beams of optical radiation, the radiation sensor S may be a suitable photodetector sensitive to the wavelength of the beams and preferably relatively insensitive to other wavelengths. If beams of RF energy are alternatively used, it will be understood that the radiation sensor S would comprise a suitable RF receiver, detector apparatus, and the like. The sensor S may be enclosed in a suitable housing which shields the sensor from extraneous radiation. Signals from the radiation sensor S are supplied to a threshold detector 22, which functions to provide an appropriate output signal on the line 23 only whenever the input signals from the sensor have a predetermined characteristic, such as an intensity which exceeds a certain predetermined threshold intensity. It will thus be understood that a signal appears on the line 23 only when the detected intensity of a beam of radiation impinging the sensor S exceeds a predetermined intensity. It will be seen that the use of the threshold detector 22 causes a signal to appear on the line 23 only at the same intensity for each occurrence of a radiation beam at the sensor S.

Curve 19 of FIG. 2 depicts a typical intensity of the beam 13a as a function of the width of the beam center line 18. The point 18' on the beam intensity curve indicates the selected threshold intensity which must be present at the sensor S in order to provide an output signal from the threshold detector 22. Since the beam intensity detected by the sensors is a function of the angular position of the beam relative to the sensor, with maximum intensity occurring whenever the center 18 of the beam impinges the sensor and with lesser intensities being detected as the moving beam approaches or leaves the sensor, the threshold signal intensity 18' detected by the threshold detector 22 for any given distance D between the reference location 10 and the remote location 11 is repeatably attained in sequence by the same angular position of the beams 13a and 13b as those beams move across the sensor. Although the absolute intensity of the beams 13a and 13b depends on the distance D, so that the selected threshold intensity point 18' may fall at various locations on the slope of the intensity curve 19 for various distances D, the relative arc between the threshold points 18' on the two beams 13a and 13b is unchanged for a particular distance D. The time required for that relative arc between the threshold points on the two beams to traverse the sensor S is, accordingly, a measure of the distance D.

Looking again to FIG. 1, the line 23 is connected to the input of a flip-flop circuit 24 so that the flip-flop changes state in response to each appearance of a signal on the line 23. One of the outputs 24a of the flip-flop 24 is supplied as an input to the AND gate 25, and the other input to the AND gate is supplied along the line 26 from the clock 27 which provides clock pulses 29 [FIG. 3(d)] at an appropriate predetermined rate. The output 25a of the AND gate 25 is supplied to a counter 28, and it will be seen that pulses from the clock 27 are gated to drive the counter 28 only whenever the AND gate 25 receives an enabling signal from the flip-flop 24.

Turning to the operation of the embodiment as thus described, and with reference to the waveforms shown in FIGS. 3(a) through 3(e), it is initially assumed that the remote location 11 is within receiving range of the beams of radiation 13a and 13b that emanate from the reference location 10. It is also assumed that the flip-flop 24 is presently in a state which disenables the AND gate 25 so that the counter 28 is not operating. The radiation sensor S will supply a signal 30a, shown in FIG. 3(a), to the threshold detector 22 when the first-to-arrive beam of radiation 13a impinges the sensor. FIG. 3(b) shows signals on the line 23 from the threshold detector 22, and the threshold detector operates to supply a signal 31a along the line 23 to the flip-flop 24 whenever the amplitude of the detected radiation signal reaches a predetermined threshold level 32 corresponding to a particular angular position of that beam. As seen in FIGS. 3(b) and 3(c), the signal 31 from the threshold detector functions to gate the flip-flop 24 and so that signal need not be coterminous with the portion of the sensed radiation signal 30a (or 30b) which exceeds the threshold level 32.

The flip-flop 24 changes state in response to the leading edge of the signal on the line 23, thereby applying an enabling signal 33 on the line 24a as shown in FIG. 3(c) to turn on the AND gate 25 and enable the counter 28 to receive and accumulate clock pulses 29 generated by the clock 27. The counter 28 continues to operate until the next-to-arrive beam of radiation 13b impinges the radiation sensor S with a signal 30b having sufficient amplitude to again cause the threshold detector to provide a momentary pulse 31b on the line 23, corresponding to an angular position of the beam 13b which is the same as the aforementioned particular angular position of the beam 13a, whereupon the flip-flop 24 again changes state and the enabling signal 33 is withdrawn from the AND gate 25. The flip-flop 24 is seen to trigger on the leading edge of each signal 31a and 31b from the threshold detector, although those skilled in the art will realize that trailing-edge triggering can alternatively be used.

The number of clock pulses counted by the counter 28 during the time 34, as shown in FIG. 3(e), is thus a function of the elapsed time between detection of the two beams of radiation 13a and 13b at the remote location 11, and it can be shown that this elapsed time is inversely proportional to the distance D (FIG. 1) between the reference location 10 and the remote location 11. The number of clock pulses counted by the counter 28 during the time 34 between passage of the two beams 13a and 13b is thus an indication of the distance D, and it will be understood that the counter 28 can be calibrated to directly indicate that distance in units that are appropriate to the particular distance-measuring application of the apparatus.

Although the embodiment shown in FIG. 1 utilizes a pair of parallel beams of radiation, it should be understood that the present system also works in connection with paired beams of radiation which diverge at a known angle with respect to a point of divergence which is not coincident with the axis about which the beams rotate. Referring to the alternative embodiment shown in FIG. 4, the two beams of radiation 13a' and 13b' are seen to emanate from suitable radiation sources 40a and 40b, respectively. The two beams 13a' and 13b' are separated by the fixed angle of divergence $\theta$ so that the beams diverge from an imaginary point of divergence 41 which is located in non-concentric relation with the axis 42 about which the beams rotate or oscillate in unison. It will be understood that the radiation sources 40a and 40b are mounted on an appropriate platform or other means which is driven for rotation about the axis of rotation 42, so that each of the beams 13a' and 13b' sweep in unison at an angular velocity.

The two beams of radiation 13a' and 13b' are detected at a remote location by detecting apparatus of the type shown and described with reference to FIG. 1, so that the time between traverse of each beam at the remote location is a function of the straight-line distance which separates the two locations. Placement of the point 41 of divergence behind the axis 42 of rotation makes the time between each radiation beam a function of distance; it will be understood that the embodiment shown in FIG. 1, in which the beams of radiation are mutually parallel, places the point of beam conversion at an infinite distance behind the axis about which the beams rotate. It will also be understood that the time-vs.-distance calibration for nonparallel-beam embodiments, such as shown in FIG. 4, is different from the corresponding calibration for embodiments as in FIG. 1 which use parallel beams.

Although the embodiments as presently described assume that the beams of radiation are rotating, or in the alternative are traversing an arc, at a fixed and known velocity which is identical for each reference location 10, it is possible to transmit information corresponding to the rotational velocity of the beams. This velocity information would be transmitted from each reference location for reception at any remote location, and would be used to insure that the time base used for time-derived distance measurements at the remote location would be absolutely accurate. One such apparatus is shown in FIG. 5, wherein the rotational drive mechanism 12 is coupled to a suitable signal modulator 46 which operates to transmit a velocity-indicating signal from the reference location 10. The velocity-responsive signal is received at the remote location 11 by the receiver 47, which demodulates the signal to yield a velocity-responsive calibration signal that is applied along line 48 to control the output frequency of the clock 27. The clock 27 thus is controlled by the velocity-responsive signal to operate at a frequency which is determined by the rotational velocity of the beams of radiation, so that the measured time difference at the remote location depends only on the separation distance between remote and reference locations. Variations in the rotational velocity of the beams do not affect distance measurements with the embodiment as in FIG. 5.

In the case of velocity information transmittal as in FIG. 5, that information can be transmitted along a separate radio link or alternatively along either or both of the moving beams of radiation.

The present invention can also be used to determine the range of a radiation beam of unknown origin which periodically sweeps a location. One example of a sweeping radiation beam of unknown origin would be an enemy radar beam which is detected periodically sweeping a potential target location. Referring to FIG. 6, the presence of an unidentified radiation beam 51 is detected sweeping past the location 52, and it is desired to determine the range R between that location and the distant location 53 from which the radiation beam apparently emanates. It is assumed that the beam 51 is sweeping the location 52 at a rate of scan which is unknown, unlike the scan rate of the known radiation beams used in the previously-described embodiments, but which is periodic and can therefore be ascertained with the aid of the apparatus shown in FIG. 6.

The beam detection and ranging apparatus at location 52 includes a pair of sensors 54a and 54b that are responsive to the radiation beam 51. The sensors 54a and 54b are separated by a predetermined distance d, and it will be understood that the distance d must be substantially perpendicular to the radiation beam 51 for accurate measurement of the range R to the distant location 53.

One of the radiation sensors, such as the sensor 54a, is connected by the line 55 to the rate counter 56, which also receives clock pulses at a predetermined rate along the line 57 from the clock 58. Clock pulses from the clock 58 are also supplied to a counter 62 which has a "start" input 63 and a "stop" input 64. The start input 63 of the counter 62 is connected to receive signals from the sensor 54a, and the stop input 64 is similarly connected to receive signals from the sensor 54b.

The operation of the ranging embodiment shown in FIG. 6 will become apparent from the following description. As the radiation beam 51 of unknown sweep rate is detected by the sensor 54a, a signal is supplied along the line 55 to turn on the rate counter 56. The operation of the counter 62 may be disabled at this point, if desired, by appropriate circuitry not shown in FIG. 6. The rate counter 56 is now counting clock pulses from the clock 58, and continues to do so until the radiation beam 51 undergoes a complete sweep cycle and next sweeps past the sensor 54a to produce another input signal along the line 55, in response to which the rate counter is stopped. The rate counter 56 thus has counted clock pulses for a time which corresponds to the apparent sweep rate of the beam 51, and a signal corresponding to that time appears on the output line 66 from the rate counter. It will be apparent that the times required for several sweeps of the beam 51 can be measured in the foregoing manner, and then compared to ascertain that the beam sweep rate is in fact periodic.

Once a signal corresponding to the sweep rate of the beam 51 is determined, the time required for the beam to sweep the distance d between the sensors 54a and 54b is determined by the counter 62, which counts the clock pulses as the beam sweeps from sensor 54a to 54b. That sweep time appears in the form of a signal on the output line 67, and that time signal is supplied as an input to the arithmetic unit 68 along with the previously-determined sweep rate signal on the line 66.

Since the apparent sweep rate of the radiation beam 51 is now known, and is represented by the signal on line 66, the product of that sweep rate and the time required for the beam to traverse the distance d yields the angle $\alpha$ that is subtended between the distant location 53 and the two sensors 54a and 54b. Once that subtended angle is calculated, the range R between either of the sensors 54a, 54b, and the distant location 53 can be calculated with straightforward trigonometric relationships. The arithmetic unit 68 performs the mathematical computations necessary to produce a range signal corresponding to the range R, and the construction and operation of an appropriate arithmetic unit 68 to perform the necessary computations is well within the abilities of one of ordinary skill in the art. A relatively simple programmed digital computer obviously can perform the function of that arithmetic unit, although it is considered that an appropriate microprocessor would be utilized for the purpose in an actual embodiment of the apparatus shown in FIG. 6. The resulting output of the arithmetic unit is a signal corresponding to the range R between the locations 52 and 53, and that range signal can be displayed in any appropriate manner forming no part of the present invention.

It will thus be seen that the distance measuring system of the present invention is a passive system which does not employ radiation transmission at the receiving or measuring location 11, and which does not require measurement of relatively small increments of time as in the case of beam transit-time measuring systems of the prior art. Since only a single sensor S is at the remote location, the azimuthal alignment of the sensor relative to the reference location is not critical so long as the sensor can detect beams having intensities that are sufficient to operate the threshold detector. When used in surveying applications, for instance, the reference location apparatus 10 of the present invention can be mounted at a desired location and distance measurements can be taken at one or more remote locations. Survey distances can be measured "around corners" in a single measurement by positioning a suitable mirror at the corner, thereby reducing the number of separate measurements and the possibility of error for each measurement.

In airborne or other vehicular applications of the present invention, any number of vehicles can become "remote locations" equipped as shown at 11 above, and distances can be measured relative to one or more appropriate reference locations. Since the present system does not rely on transit time of a radiation beam, it will be understood that an airborne application of the present system measures the radial distance between the reference location and any remote location, rather than the slant range distance as in the case of conventional DME equipment as aforementioned.

It will be apparent that the foregoing relates only to a disclosed embodiment of the present invention, and that numerous modifications and alterations may be made therein without departing from the spirit and the scope of the invention as defined in the following claims.

I claim:

1. System for determining the distance between a first location and a second location, comprising:
    means at said first location for providing a pair of separate beams of radiation which have a predetermined angular relation to each other and which traverse said second location at a predetermined angular velocity;
    said beams of radiation rotating about an axis of rotation at said first location; and
    said beams diverging at a fixed angle in relation to a point of divergence which is not coincident with said axis of rotation;
    means at said second location for detecting the presence of said beams of radiation; and
    means at said second location responsive to said detecting means to provide a signal corresponding to the elapsed time between detection of said separate beams as said pair of beams traverses the second location.

2. The system as in claim 1, wherein said beams of radiation rotate about an axis substantially perpendicular to a plane occupied by said first and second locations.

3. The system as in claim 1, wherein said beams rotate about said axis in unison and at a constant velocity.

4. The system as in claim 1, wherein said detecting means is operative to indicate the presence of each of said beams only in response to the detected presence of said radiation at a predetermined threshold intensity, so that said elapsed time is determined by the time for said detection means to be traversed by said threshold intensity of each beam of said pair of beams.

5. The system as in claim 4, wherein said means at said first location is operative to provide said pair of beams having substantially equal intensity.

6. The system as in claim 1, wherein said beams of radiation rotate about said axis in unison and at a constant angular velocity.

7. The system as in claim 1, wherein said beams of radiation rotate about said axis at a known angular acceleration for a certain angular displacement.

8. System for determining the distance between a first location and a second location, comprising:
    means at said frst location for providing a pair of separate beams of radiation which have a predetermined angular relation to each other and which traverse said second location at a predetermined angular velocity;
    means at said first location operative in response to the actual angular velocity of said beams of radiation to transmit a control signal which is a function of said angular velocity;
    means at said second location for detecting the presence of said beams of radiation;
    means at said second location responsive to said detecting means to provide a signal corresponding to the elapsed time between detection of said separate beams as said pair of beams traverses the second location;
    said means at said second location comprising clock means for producing clock pulses at a predetermined repetition rate;
    said clock means being operative in response to said control signal to adjust the repetition rate of clock pulses so that said number of clock pulses counted during said traverse is unaffected by variations in said angular velocity;

means responsive to said timing signals and selectably operative to count said timing signals;

said counting means being responsive to said detecting means to count said timing signals only during the time in which said beams accomplish a predetermined traverse of said second location, so that the number of said timing signals counted by said counting means during said traverse corresponds to said distance between said first location and said second location; and said means for providing timing signals is responsive to the angular velocity of said beams of radiation to provide said timing signals at an adjustable repetition rate determined by said angular velocity.

* * * * *